Sept. 29, 1970  E. R. WEICKGENANNT  3,530,586
SPEED REDUCER CONSTRUCTION FOR DRIVING DENTAL TOOLS
Original Filed Feb. 27, 1964  2 Sheets-Sheet 2

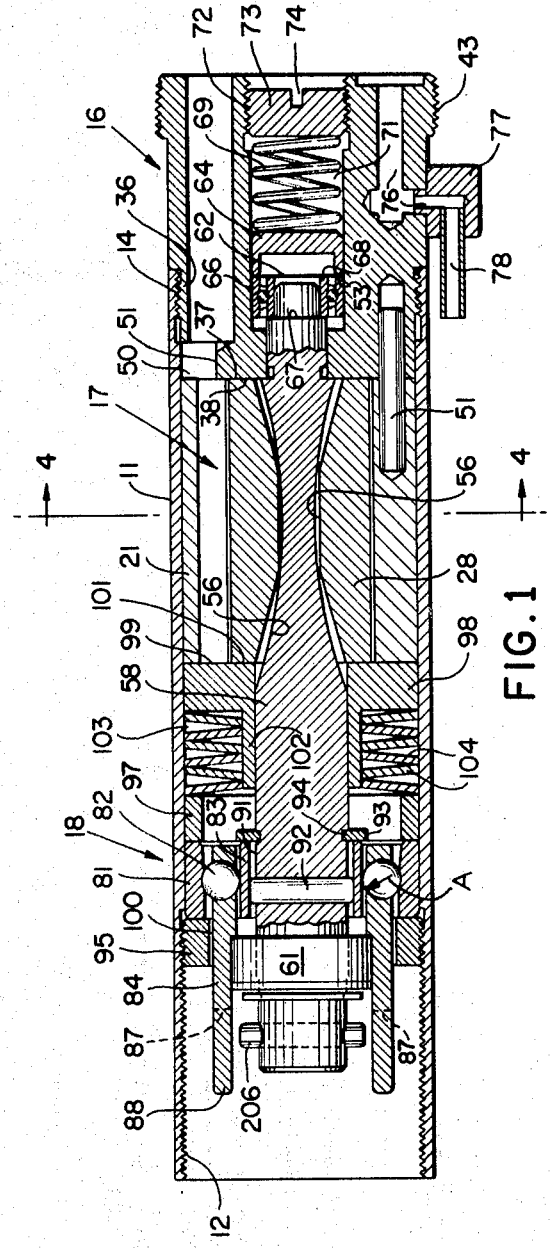
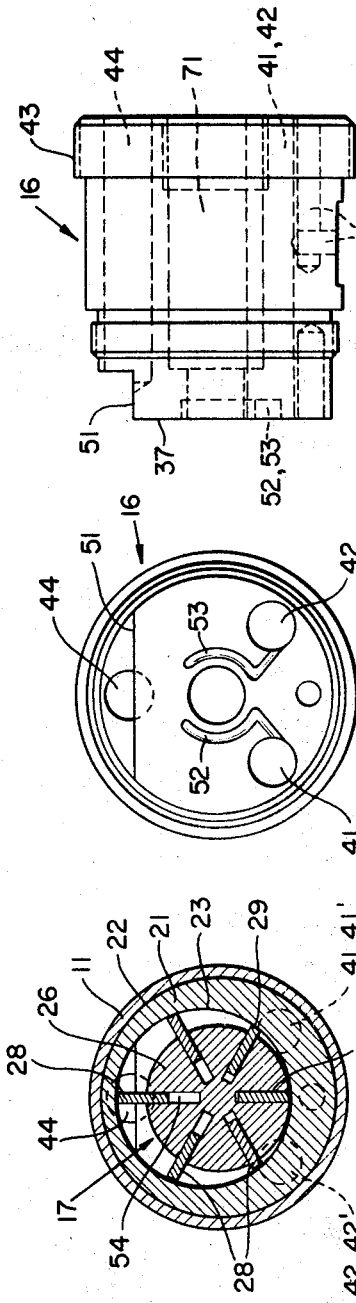

INVENTOR.
EGON R. WEICKGENANNT
BY
ATTORNEYS

United States Patent Office 3,530,586
Patented Sept. 29, 1970

3,530,586
SPEED REDUCER CONSTRUCTION FOR DRIVING DENTAL TOOLS
Egon R. Weickgenannt, Rochester, N.Y., assignor to Sybron Corporation, Rochester, N.Y., a corporation of New York
Original application Feb. 27, 1964, Ser. No. 347,813, now Patent No. 3,309,965, dated Mar. 21, 1967. Divided and this application Jan. 13, 1967, Ser. No. 609,179
Int. Cl. A61c 1/08
U.S. Cl. 32—26        10 Claims

ABSTRACT OF THE DISCLOSURE

A dental instrument comprising: (1) a motor housing containing a motor, a motor shaft, a speed reducer, and a first power output connection means connected to the motor shaft and a second power output connection means connected to the speed reducer, and (2) a tool housing containing a chuck for holding the shank of a dental tool, a shaft for driving the chuck, a spring pressed collet for clamping a tool shank in the chuck, means for releasing the collet against the spring, and a removable coupling means for coupling the tool shaft to one of the first and second power output connection means. The tool housing and the motor housing have mating attaching means such that when they are attached the coupling means is connected to one of the motor shaft and the speed reducer depending on which removable coupling means is employed.

---

This invention relates to a fluid motor combined with a speed reducer for driving dental tools such as drills, burrs and abrasive wheels at relatively low speeds. This application is a division of application Ser. No. 347,813, filed on Feb. 27, 1964, the title Combined Fluid Motor and Speed Reducer for Driving Dental Tools, co-pending and now Pat. No. 3,309,965 issued Mar. 21, 1967.

While my invention may have other fields of application, it has been primarily designed for application in the dental industry for driving dental cutting tools at relatively low speeds and to generate high torque. Prior to the advent of high speed drills, all dental drills or other tools were driven by so-called dental engines through belt and pulley connections extending from the motor. The drive comprised a belt driven by the motor extending outwardly along or within a dental arm and from thence downward adjacent articulated linkage carrying a dental handpiece in which the shank of the drill or dental tool was fitted. The drive was by a cable or cord extending over and around a series of pulleys. This general arrangement of drive for dental drills or burrs has been used for a great many years. Through a rheostat, usually located in a foot controller, the speed of the drill could be varied from approximately 3,000 r.p.m. to 5,000 r.p.m. to a speed of 20,000 r.p.m. to 25,000 r.p.m.

The belts and pulleys of such drives have always caused the dentist difficulties due to breakage of the belts, slippage of the belts on the pulleys and loosening of the belts resulting in a loss of speed and torque. Moreover, the considerable number of parts involved, particularly rotating parts between the motor and drill shank were a constant source of trouble. Such drives may be generally considered as providing high torque at relatively low speeds.

In recent years, the so-called high speed drill has become popular with dentists for a number of reasons. The speed of such drills extends from 100,000 r.p.m. to about 3000,000 r.p.m. They comprise a turbine operatively, usually directly connected to the shank of a drill driven, usually driven by air underpressure and are what are known in the art as "high speed drills" or air rotors. In general, they provide low torque and high speed. Such speeds have distinct advantages in causing less pain to the patient and enabling the dentist to perform his work more efficiently and much faster.

While such high speed drills were a great advance in the art of dentistry, they could not fully supplant the conventional dental engine described above. In some of his work, the dentist is required to use comparatively low speeds and the drill must be capable of producing relatively high torque. Low speeds, for example, with high torque are preferred by most dentists for finishing operations on a tooth being prepared for filling and for other purposes not necessary to enumerate. Thus, in recent years, the conventional dental unit supplied to the dentist by the manufacturer thereof has been equipped with a high speed drilling unit driven by air and a dental engine for low speeds and high torque.

Recent efforts have been made to eliminate the dental engine by fluid driven turbines or other means to give the dentist what he needs in the form of relatively low speeds and high torque.

An object of this invention is to provide a drive for a dental cutting tool or drill to obtain relatively high drill torque at relatively low drill speeds and enable elimination of the costly and troublesome dental engine and its appurtenances.

Another object of this invention is to provide a highly efficient fluid or air motor capable of providing a variable speed drive for the drill but the invention is primarily concerned with providing the dentist with a drive capable of producing relatively high torque at relatively low drill speeds.

Another object of this invention is to provide a combined air or fluid motor and speed reducer which is highly efficient in operation and converts the high speed motor output to a substantially lower speed together with drive means connected to the dental drill to provide relatively low drill speeds at relatively high torque.

Still another object of this invention is to provide a dental drill assembly with improved means for supporting the drill and for locking and unlocking the shank of the drill and a drive for the drill which may be quickly connected to and removed from the power takeoff of a combined fluid motor and speed reducer.

Other objects and advantages of my invention will be particularly set forth in the claims and will be apparent from the following description, when taken in connection with the accompanying drawings, in which:

FIG. 1 is a longitudinal sectional view of the combined fluid motor and speed reducer of my invention;

FIG. 4 is a sectional view taken substantially on the line 4—4 of FIG. 1 in the direction indicated by the arrows, and showing the sliding blades or vanes and showing the common exhaust port and the intake ports for intake of air under pressure, one port being for rotation of the rotor in one direction and the other for reversal of the direction of rotation of the rotor;

FIG. 5 is a view of the motor end of the plug or end piece which faces against the rotor, the view showing the passages for air to a position behind the rear edges of the blades or vanes to force them outward in starting the rotor;

FIG. 7 is a side elevation of the plug or end piece and showing in dotted lines the various passages extending therethrough.

Figure 2:
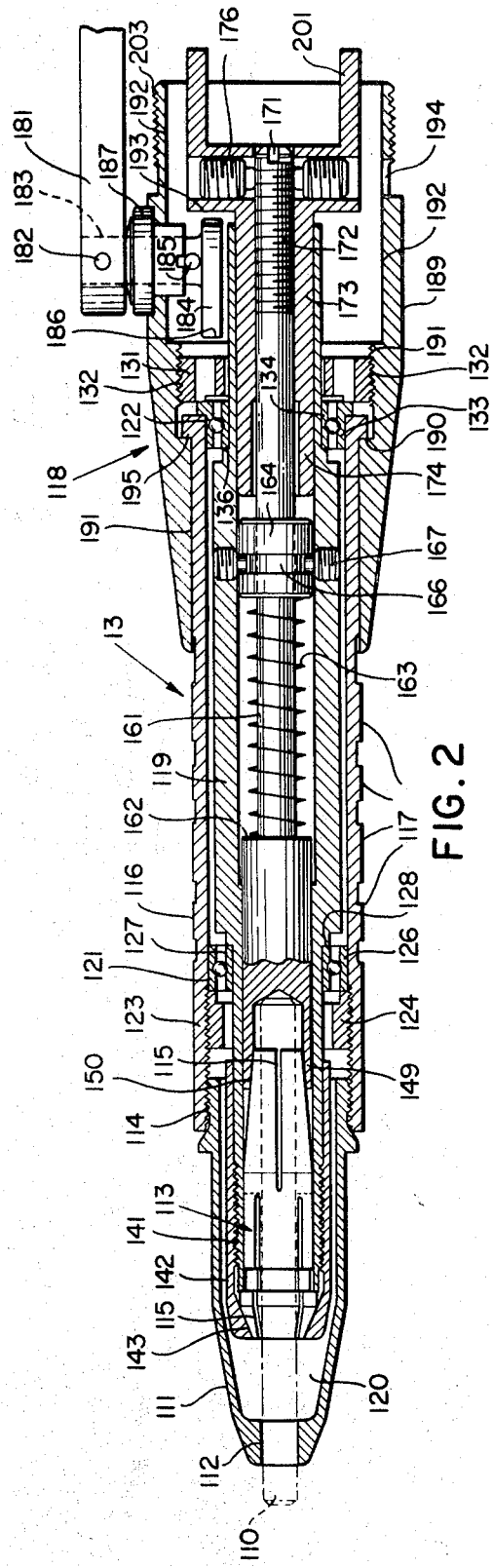
FIG. 2 is a longitudinal sectional view of the handpiece assembly arranged to receive the low speed take-off of the combined fluid motor and speed reducer.
Figure 6:
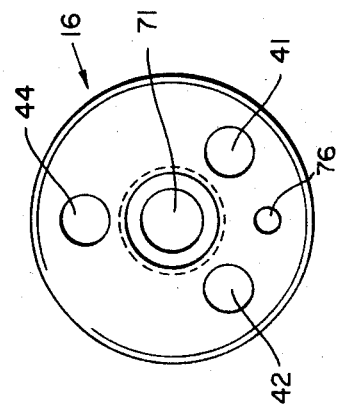
FIG. 6 is an end view of the plug or end piece showing the ports for intake and exhaust of air and the intake passage for water.

The combined fluid motor and speed reducer of my invention is enclosed within a rotor housing 11 which is a cylindrical tube open at both ends. One end is internally threaded, as shown at 12, for the reception of the handpiece assembly, indicated generally by the numeral 13 and shown in FIG. 2; and the other end is threaded, as shown at 14, for the reception of a plug or end piece generally indicated by the numeral 16.

Mounted in the rotor housing 11 is a fluid motor generally indicated by the numeral 17, and a speed reducer generally indicated by the numeral 18. As will presently appear, the motor is arranged so that it will drive the handpiece assembly either at the speed of rotation of the rotor and rotor shaft or at a reduced speed through the speed reducer assembly 18.

The fluid motor, generally indicated by the numeral 17, comprises a rotor casing 21 the external wall 22 of which is cylindrical and fits into the housing 11. The internal wall 23 of the rotor casing is eccentric with respect to the axis of the unit and the centerline of the housing 11 as shown most clearly in FIG. 4.

A rotor 26 (FIG. 4) is cylindrical in cross-section and has milled therein a plurality of radial slots 27, in this case six, the lower walls of which are curved on the arcs of relatively large circles. Each of the slots 27 is adapted to receive a vane or blade 28. The blades are adapted to slide radially in the slots being thrown outward by centrifugal force so that the outer edges 29 of the blades (FIG. 4) ride on the inner wall of the eccentric rotor casing 21. It would be possible to use fluid turbines or motors of other types instead of the particular fluid motor shown. For example, a turbine might be employed in which the vanes and rotor are integral. However, such a turbine or motor is not a positive displacement unit. It does not develop instantaneous torque. With a motor of the type shown herein and with the casing 21 well lubricated, of course except when the motor is stationary, the blades form a tight seal with respect to the internal wall 23 of the eccentric casing 21. Leakage of air is reduced to a minimum and the assembly for practical purposes is a positive displacement unit. A motor of the type shown will develop relatively high torque using air at pressures well within the pressures of the compressors now available in dental offices and will develop instantaneous torque.

The previously mentioned end piece or plug, generally indicated by the numeral 16, is threaded at 36 into the threads 14 until the face or end wall 37 thereof engages the face 38 of the end wall of the rotor. The face 37 of the end piece thus shrouds the rotor 26, the side edges of the blades 28 and the lateral edge of the eccentric casing 21.

As shown most clearly in FIG. 5, which is a view of the face 37 of the end piece, the end piece or plug 16 has a pair of inlet ports or passages 41 and 42 for the reception of air under pressure. The end piece 16 is threaded, as shown at 43, for the reception of a fitting (not shown) which carries preferably flexible air intake passages or hoses connected to the intake ports 41 and 42. The end piece is also provided with a common exhaust port 44 which receives the air or other fluid flowing to the rotor from either intake port 41 or 42 and subsequently exhausted from between the blades 28.

The fluid motor is provided with a foot controller (not shown) by which air is supplied to either the port 41 or the port 42. The foot controller is also provided with means for varying the pressure of air to vary the speed of rotation of the rotor and with an oil supplying and regulating unit which may be similar to those now in common use with high speed air driven turbines. When the air enters the port 41, as dictated by the position of the foot controller, the rotor rotates in a counter clockwise direction, as viewed from the end of the rotor (FIG. 4). When the air is supplied to the port or passage 42, as dictated by the position of the foot controller, the rotor is rotated in a clockwise direction.

In dental work it is highly desirable that the dentist be able to selectively rotate the dental drill in either direction. This need occurs, for example, when the dentist is performing finishing operations and the burr gets stuck, or when the dentist is using a threaded shank for mounting a grinding wheel. In the latter case, the grinding wheel should normally rotate in a direction such as to thread the grinding wheel more tightly on the shank. When removal of the dental wheel is desired, reversal of the motor readily accomplishes this result.

The ports or passages 41 and 42 extend through the end plug as indicated in dotted lines in FIG. 7. The ports 41 and 42 extend into ports or cutouts 41' and 42' in the adjacent face of the rotor 26. The face 37 of the end piece 16 (FIG. 5) is cut off to provide a planar wall 51, the space 50 thus provided being in communication with the common exhaust passage 44. This space or cavity 50, as will be apparent, is in communication with the spaces between the blades 28. To locate the end piece or plug 16 properly with respect to the eccentric casing so that the ports will register with the adjacent rotor, the eccentric casing 21 and the end piece 16 are bored for the reception of one or more locating pins 51.

As shown most clearly in FIG. 5, the face 37 of the end piece 16 has a pair of shaped ducts 52 and 53, the major portions of which are curved on the arc of a circle, the center of which is the axis of the rotor. These ducts communicate respectively with the passages 41 and 42. The air ducts 52 and 53 communicate with the bottoms of the slots in which the blades 28 slide through cut outs in the adjacent face of the eccentric casing 21. For this purpose, each of the slots is milled on the arc of a circle 54 and the blades 28 have an irregular shape along their bottom or rearward edges as indicated at 56. This arrangement provides passages along the inner edges of the blades through which air from either the air duct 52 or air duct 53 may flow for the purpose of urging the blades radially outward.

The outward movement of the blades assists in starting the rotor which is important as the rotor must be started and stopped hundreds of times a day. As soon as the blades are sufficiently beyond the perimeter of the rotor 26, the air flowing to the space between them acts upon the blades to drive the blades. Centrifugal force impels the blades slidably outward in the slots to engage the inner wall 23 of the eccentric casing 21. Torque development is substantially instantaneous. This action seals the outer edges of the blades against the film of oil on the casing wall. The purpose of milling the slots 54 on the arc of a circle is to provide greater support for the blades and obtain more torque from the fluid motor for a given cross-section of casing inner wall 23.

The rotor 26 is preferably integral with a shaft 58, although these two elements may be separately formed and rigidly secured together. In the particular arrangement of the parts to carry out the concept of this invention, the rotor and shaft should move longitudinally of the axis of the shaft as a unit. The shaft 58 is mounted in bearings 61 and 62. The bearing 61 is a permanent part of the speed reducer 18. Its primary function is to support the speed reducer bearing retainer as will presently appear.

As will be apparent from what follows, the amount of shift of the shaft and rotor longitudinally of the axis of the shaft need only be a few thousandths of an inch. Throughout this application I am talking in terms of minute movements to accomplish speed reduction and balance the motor. For the purpose of shifting the shaft, the rim 53 of a cup washer 64 bears on the edge of the outer race 66 of the bearing 62. The shaft 58 is decreased in diameter at its end to provide an annular shoulder 67 against which the inner race 68 of the bearing may bear.

The ends of the shaft 58, the bearing 62, the cup washer 64 and a spring 69 are arranged in a bore 71 formed in the end piece or plug 16. The bore 71 is threaded at 72 to receive an adjustable spring stop or nut 73 threaded into the bore. The stop is slotted at 74 for the reception of a screwdriver.

Upon threading inward on the spring stop 73, pressure is applied through the spring 69, outer race 62 of the bearing and the anti-friction elements to the inner race 68 of the bearing. The inner race 68 presses against the shoulder 67 and urges the shaft and rotor in a direction to the left as viewed in FIG. 1. Proper adjustment of the load on the spring 69 enables a preloading of the shaft and rotor in a direction to the left, as viewed in FIG. 1.

Usually with dental drills a water supply is provided for the purpose of cooling the tooth being drilled and the drill as drilling proceeds. For this purpose, the end piece or plug has angularly arranged bores 76 the ends of which open into fitting 77 having an outlet 78. The outlet connection 78 may be connected to a tubular member (not shown) either rigid or flexible. The end of the tubular member, as is common practice, is directed so as to supply water in a stream, mist or spray onto the end of the drill and the adjacent tooth being drilled.

The speed reducer, generally indicated by the numeral 18, comprises a ball-bearing assembly having an outer race 81, a plurality of balls 82, or other anti-friction members, an inner race 83 and an extended bearing retainer 84. The bearing retainer 84 at its extended end is provided with a pluarlity of teeth, in this case two, or what may be termed a clutch. The bottoms of the teeth are indicated by the numeral 87 and the teeth themselves by the numeral 88. This clutch 88, constituting the driven member of the combined air motor and speed reducer, is connected through a similar coupling or clutch, as will be more particularly described herein, to drive a dental drill, burr or other dental cutting tool.

The inner race 83 is slotted lengthwise thereof, as shown at 91, to provide a key-way for the reception of a pin 92 fixed to the shaft 58. A stop 93 fixed in a groove 94 in the shaft 58 presses on the end of the inner bearing race with the pressure exerted by the spring 69. By adjusting the nut 73 this pressure may be varied to preload the assembly a variable amount.

It will now be understood that the pin 92 may shift in the key-way 91. However, in general both the bearing assembly and the shaft move approximately together a few thousandths of an inch, as dictated by the preloading of the spring 69. In general, this preloading increases or forms a clearance between the faces 37 and 38, defined by the wall of the end piece of plugs 16 and the end face of the rotor 26.

An adjusting nut 95 having wrench openings (not shown) in its outer face, is threaded into the threads 12 of the housing 11. The nut is clear of the driven retainer 84, as shown at 100. By threading inward on the nut 95 it will engage the outer race 81 of the bearing assembly. The amount of adjustment of the nut 95, as will be apparent, is a variable.

The other end of the outer bearing race 81 engages a collar or spacing sleeve 97 which is slidably fitted in the cylindrical housing 11. An air seal member 98 having a sealing face 99 is adapted to engage face 101. Face 101 is the combined face defined by the end wall of the rotor 26, the side edges of the blades 28 and the end of the eccentric casing 21. The air seal member 98 is floating; it constitutes a shroud at the end of the rotor. It may be shifted longitudinally of the rotor 26 and on the shaft 58, and a variable amount depending upon the adjustment of the nut 95.

The air seal member 98 has a sleeve-like part 102 which embraces the shaft 58 and defines an annular pocket 103 in which a multiplicity of spring washers 104 are housed. These spring or so-called Bellville washers are dish-shaped and bored for reception on sleeve 102. They are placed in opposed directions, as shown in the drawings, the stack of washers being adapted to receive the pressure applied on the spacing collar 97. The purpose of using a stack of spring washers is to cut down the tolerance requirements of the various parts and to enable a relatively large adjustment of the nut 95 for a relatively small deflection of the stack of spring washers, let us say, one thousandth of an inch.

In an air motor of the type shown herein, it is important that the clearance between the faces 37, 38 and the faces 99, 101 be equal. This clearance is the minimum amount required to provide a running fit, it being understood that there is a film of oil between these sets of faces. When the clearances are equal, the air motor is properly "tuned." This fact can be readily ascertained by ear while the air motor is running.

The first step in tuning the motor, with nut 95 in a loosened condition, is to preload the shaft and rotor in a direction to the left. This is done, as previously mentioned, by adjusting the spring stop nut 73 and causing it to exert pressure through the spring 69, cup washer 64, through bearing assembly 62 onto the shoulder 67 of the shaft. This action urges the shaft 58 to the left two or three thousandths of an inch and establishes a clearance at the faces 37 and 38 which is more than the amount desired.

Pressure on the shaft 58 to the left, as viewed in FIG. 1, places pressure on the stop 93 which urges the lower race 83 of the speed reduction bearing assembly to the left. This pressure is applied through the bearings 82 to urge the outer race 81 also to the left. The nut 95, as previously mentioned, is loose with respect to the outer race 81 at the time of preloading the shaft and rotor.

During the tuning of the air motor the nut 95 is threaded inward to exert a pressure to the right on the outer race 81. At this time, the inner race 83 is butted against the stop 93. Pressure on the outer race through nut 95 throws the outer and inner races out of alignment. The pressure thus created is applied diagonally across the bearings or anti-friction members 82 in approximately the direction indicated by the arrow A in FIG. 1. When the outer race 81 is loaded and held in fixed position, the pressure on the bearing assembly along the diagonal line introduces an element of friction. This frictional loading of the bearing is variable as determined by the preloading of the spring 69 and the amount of adjustment of nut 95. In any case, a substantial degree of friction results and the driven element, the retainer 84, rotates at a considerably reduced speed from the speed of rotation of the shaft 58. The bearing assembly speed reducer acts much like a planetary gear reducer.

Simultaneously with the loading of the bearing and the introduction of excessive friction into the bearing assembly to an extent such that the driven bearing retainer 84 is driven at a reduced speed, the stack of spring washers 104 are compressed. When the face 99 of the floating air seal 98 moves into engagement with the face 101, the rotor and its integral shaft are constrained to the right an extremely minute degree. At some point in the application of pressure by means of nut 95 the clearance at the two sets of faces 99, 101 and 37, 38, are equalized. The final clearances are extremely minute, and when they are equalized, the sound generated by the rotating assembly changes in pitch so that it can be readily determined by ear when the air motor is "tuned" and the clearances are equal.

Referring now to FIG. 2, the handpiece assembly generally indicated by the numeral 13 comprises nose piece or tip 111 having a bore 112 opening into enlargement 120. The shank of a dental drill 110, for example, may be projected into a chuck generally indicated by the numeral 113. The chuck is tapered at each end and provided with slots 115 extending inward from each end of the chuck. The chuck is double acting and grips the shank 110 along two substantially annular rings.

The nose piece 111 is threaded, as shown at 114, into a barrel 116 which is suitably knurled, as shown at 117, for the reception of the fingers of the dentist. Mounted on, and free to swivel on the end of the barrel 116 is a ferrule assembly, generally indicated by the numeral 118.

Carried internally of the barrel 116 is a shaft 119 supported from the internal wall of the barrel by suitable bearings 121 and 122. The interior of the barrel 116 is threaded at 123 for the reception of a nut 124 spaced from the shaft 119. The nut 123 has wrench openings and bears against the outer race 126 of the bearing 121 while the inner race 127 of the bearing engages a shoulder 128 on the shaft 119.

A nut 131 is exteriorly threaded; spaced from the shaft 119; and adapted to be threaded on threads 132 formed interiorly of the ferrule 118. The nut 131 has wrench openings and bears against the outer race 133 of the bearing 122 while the inner race 134 bears against a shoulder 136 on the shaft 119. By the means thus described the nuts 123 and 131 clamp the shaft rigidly in position internally of and rotatably with respect to the barrel 116.

The other end of the shaft 119 is threaded, as shown at 141, to receive a nut 142 which has an internal taper 143.

The chuck 113 is mounted internally of the nut 142 and the shaft 119 and the internal taper 143 engages the external taper of the chuck so that upon pressure being applied on the chuck in a direction toward the left, as viewed in FIG. 2, pressure is applied between the internal taper 143 of the nut and external taper of the chuck. Slots 115 at the left of the chuck are squeezed together to grip the shank 110 of the dental drill.

A collet 149 mounted internally of the shaft 119 has a tapered end at 150 engaging the other tapered end of the chuck 113. Upon exerting pressure on the collet 149; to the left as viewed in FIG. 2, the taper 150 rides up on the taper of the collet 149 and simultaneously through this pressure the chuck is shifted to the left with respect to the nut 142 so that both tapers of the chuck are squeezed against the shank 110 of the cutting instrument.

The collet is, of course, rotated with the shaft 119 and decreased in diameter at 161 to provide a shoulder 162 against which one of a spring 163 may bear. The retainer 164 is grooved at 166 to receive the ends of screws 167 extending into threaded bores formed in the sidewalls of the shaft 119.

The reduced end 161 of the collet 149 extends through the retainer 164 and extends to the right, as viewed in FIG. 2. The entrance end projects into the ferrule 118 and has a screw driver slot 171 on its extended face. The end of the collet extension 161 is threaded at 172 to receive mating threads on a driven member 173. The driven member 173 has an extended part 174 extending in concentric relation to the extended end of the collet. A pair of set screws 176 extend into threaded bores of the driven part 173 and tighten on the extended end 161 of the collet.

A release lever 181 is pinned, as shown at 182, to a stub shaft 183. The shaft 183 is integral with a cam 184 having a flat spot 186 on its lobe. The stub shaft 183 extends through a fitting 187 fixed with respect to the ferrule 118. A pin 185 on the shaft 183 rides into a slot on the fitting 187 to releasably hold the parts in the position shown in the drawings.

The ferrule, generally indicated by the numeral 118, comprises the generally cylindrical part 189 which has bores 191 and 192 for the reception of the various parts heretofore described. The bore 191 is threaded, as previously mentioned, to receive the nut 131. The bore 191 is decreased in diameter forward of the threads to define a shoulder 190 upon which an annular enlargement on the barrel 116 seats. The bearing 122 has an annular enlargement 195 which seats on the end of the barrel 116 the parts being held in position as shown in FIG. 2 by the nut 131. As will be clear from the foregoing, the ferrule is free to swivel on the barrel 116. The purpose of the swivel is to allow rotation of the ferrule if the air and water connections to the air motor are under strain. This strain would be communicated to the dentist if no swivel were provided.

The driven member 173 has a bearing surface 193 against which the cam 184 may bear. When the cam is rotated so that the flat spot defining the high point or lobe of the cam lies against the bearing point 193, the collet is shifted to the right, as viewed in FIG. 2, to compress spring 163 to release the gripping action of the chuck 113. To clamp the shank, release lever is rotated to shift the cam 184 off its high spot 186 thus releasing spring 163. The pressure of the spring shifts the entire collet assembly to clamp both ends of the chuck around the shank of the drill as previously described. The purpose of the flat spot on the lobe of the cam 184 is to substantially avoid release of the spring 163 accidentaly and require the dentist to exert a positive rotative force on the lever 181 to release the force of spring 163.

The ferrule 118 has an opening 194 through which access to the set screws 176 may be obtained. Upon loosening the set screw the driven member 173 may be removed from the handpiece assembly by threading outward on the driven member 173 with respect to the threaded end 172 of the collet. This may be accomplished after the handpiece is disconnected from the motor drive of FIG. 1 as will presently appear.

Figure 3:
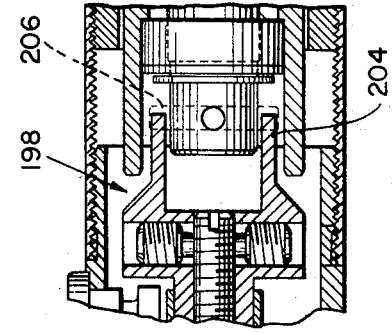
FIG. 3 shows the driven connection of the handpiece assembly arranged for high speed drive.

Upon removal of the driven member 173 from the collet extension another driven member, indicated generally by the numeral 198 corresponding generally to the driven member 173 may be threaded on the extended end of the collet. This alternate driven member 198 is shown in FIG. 3. The only difference between the driven members 173 and 198 are that the two teeth 201 on the driven member 173 are the circumference of a larger circle than the corresponding teeth 204 on the driven part 198.

The end of the ferrule 118 is threaded externally at 203 so that it may be threaded into the internally threaded end 12 of the housing 11 which encloses the fliud motor and speed reducer. With the assembly arranged as shown in FIG. 2, the teeth 201 mate with the teeth 88 of the speed reducer. The drill is then driven at low speed. When the driven member 198 of FIG. 3 is threaded on the extended end of the collet extension 161, the teeth 204 thereof mate with a pin 206 (FIG. 1) on the end of the shaft 58 of the air motor. The drill is then driven directly from the shaft at relatively high speed.

It will be understood that as previously mentioned, a foot controller controls the pressure of air supplied to the air motor. By varying the air pressure the air motor may be varied in speed. When the driven member 173 is used a low range of speed is provided. By using the driven member 198 shown in FIG. 3, a higher range of speed is provided. Speed variations within the range is determined by the setting of the foot controller. Thus the speed and torque may be adjusted by the dentist to suit the operating conditions. By threading the driven member 173 or the driven member 198 with respect to the extended end 161 of the collet, the distance between the cam 184 and the bearing part 193 may be made in the desired amount. Thus the pressure of spring 163 may be varied to close the chuck with a force that may be varied.

While I have shown and described the preferred form of mechanism of my invention, it will be apparent that various modifications and changes may be made therein particularly in the form and relation of parts, without departing from the spirit of my invention, as set forth in the appended claims.

I claim:
1. A cutting tool assembly comprising in combination:
(a) a motor;
(b) a shaft driven by said motor;
(c) a motor housing enclosing said motor and shaft, said housing having attaching means at one end thereof;
(d) a plurality of connection means connected to and driven by said motor shaft, each of said connection means being driven by said motor shaft at a speed different from the speed at which each of the other connection means is driven;
(e) a cutting tool housing having a chuck for receiving and holding the shank of a cutting tool;
(f) a shaft in said tool housing for driving said chuck, said tool housing having attaching means at one end thereof for mating with said motor housing attaching means; and
(g) means for coupling said tool shaft to one of said connection means when the motor housing is attached to the tool housing.
2. A cutting tool assembly comprising in combination:
(a) a motor;
(b) a shaft driven by said motor;
(c) a motor housing enclosing said motor and shaft, said housing having attaching means at one end thereof;
(d) a cutting tool housing having means for receiving and holding the shank of said cutting tool;
(e) a shaft in said tool housing for driving the tool holding means, said tool housing having attaching means at one end thereof;
(f) means for coupling the motor shaft to the tool shaft when the motor housing is attached to the tool housing; and including
(g) speed reduction means mounted in said motor housing and driven by the motor shaft and including a speed reduction output shaft and wherein said coupling means includes means in the tool housing for coupling the tool shaft to one of the speed reduction output shaft and the motor shaft when the motor housing is attached to the tool housing.
3. A cutting tool assembly in accordance with claim 2 in which the coupling means in the tool housing is adapted to couple the tool shaft to the motor shaft and in which the coupling means is removably connected to the tool shaft such that it can be replaced by a second coupling means adapted to couple the tool shaft to the speed reduction output shaft.
4. In a dental drill, the combination of:
(a) a tool housing;
(b) a chuck in said tool housing adapted to receive the shank of a dental cutting tool;
(c) a shaft rotatably mounted in said tool housing and connected to said chuck for driving said chuck;
(d) a spring pressed collet connected to said shaft and axially movable relative to said shaft and having a shank clamping means for clamping the chuck onto the shank by the force of said spring; said collet including coupling means at the end thereof opposite the shank clamping means for receiving a motor driven connection means for driving said shaft; and
(e) manually rotatable means for releasing said collet against the action of said spring.
5. In a dental drill in accordance with claim 4 wherein said coupling means is removable from said collet and is replaceable with a different coupling means adapted to receive a different motor driven connection means whereby the dental drill may be driven at different speeds.
6. The dental drill according to claim 5 wherein said manually rotatable means moves into contact with said coupling means for releasing said collet.
7. A dental instrument comprising:
a motor housing,
a motor output shaft in the motor housing,
a speed reducer in the motor housing connected to said motor output shaft,
first connection means connected to said motor output shaft,
second connection means connected to said speed reducer,
a dental instrument housing,
means for connecting said housings together,
a chuck mounted in the dental instrument housing for receiving and holding the shank of a dental instrument,
a chuck driving shaft, and
coupling means mounted in said dental instrument housing for connecting said chuck driving shaft to one of said first and second connection means, when said housings are connected together.
8. The dental instrument according to claim 7 wherein said coupling means is removably mounted in said dental instrument housing such that said coupling means can be replaced by a different coupling means for connecting said chuck driving shaft to the other of said first and second connection means.
9. The dental instrument according to claim 8 including a spring pressed collet for clamping said chuck on a dental instrument shank and wherein said coupling means is connected to said collet.
10. The dental instrument according to claim 9 including means on said dental instrument housing for releasing said collect against the action of the spring, said releasing means including a handle, external of said dental instrument housing, and a cam connected to said handle and adapted to contact said coupling means to move said coupling means and said collet against the action of the spring.

References Cited
UNITED STATES PATENTS

| | | | |
|---|---|---|---|
| 233,709 | 10/1880 | Starr | 32—26 |
| 2,525,839 | 10/1950 | Sparklin | 77—7 |
| 2,937,008 | 5/1960 | Whittle | 253—3 |
| 3,176,547 | 4/1965 | Schnacke | 77—7 |
| 3,295,207 | 1/1967 | Leonard | 32—26 |
| 1,836,350 | 12/1931 | Whiteside | 32—26 |

ROBERT PESHOCK, Primary Examiner